(12) United States Patent
Hsu et al.

(10) Patent No.: US 8,065,520 B2
(45) Date of Patent: *Nov. 22, 2011

(54) METHOD AND APPARATUS FOR ENCRYPTED COMMUNICATIONS TO A SECURE SERVER

(75) Inventors: Stephen Dao Hui Hsu, Eugene, OR (US); James Noshir Hormuzdiar, Danbury, CT (US); Jon A Chun, Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/395,561

(22) Filed: Feb. 27, 2009

(65) Prior Publication Data

US 2009/0199000 A1 Aug. 6, 2009

Related U.S. Application Data

(63) Continuation of application No. 09/580,365, filed on May 26, 2000, now Pat. No. 7,509,490.

(51) Int. Cl.
*H04L 29/00* (2006.01)
(52) U.S. Cl. ........ 713/162; 713/150; 713/153; 713/155; 713/160; 713/169; 705/74; 705/78
(58) Field of Classification Search .................. 713/162, 713/150, 153, 155, 160, 169; 705/74, 78
See application file for complete search history.

(56) References Cited

U.S. PATENT DOCUMENTS

| 5,528,503 | A | 6/1996 | Moore et al. |
| 5,621,796 | A | 4/1997 | Davis et al. |
| 5,623,601 | A | 4/1997 | Vu |
| 5,935,212 | A | 8/1999 | Kalajan et al. |
| 5,946,674 | A | 8/1999 | Nordin et al. |
| 5,961,593 | A | 10/1999 | Gabber et al. |
| 5,987,480 | A | 11/1999 | Donohue et al. |
| 6,002,767 | A | 12/1999 | Kramer |
| 6,003,084 | A | 12/1999 | Green et al. |
| 6,029,245 | A | 2/2000 | Scanlan |
| 6,032,260 | A | 2/2000 | Sasmazel et al. |

(Continued)

OTHER PUBLICATIONS

Office Action of Feb. 21, 2006, in U.S. Appl. No. 09/972,226, 21 pages.

(Continued)

*Primary Examiner* — Kambiz Zand
*Assistant Examiner* — Tongoc Tran
(74) *Attorney, Agent, or Firm* — Meyertons, Hood, Kivlin, Kowert & Goetzel, P.C.; Dean M. Munyon

(57) ABSTRACT

An embodiment of the invention includes a secure server. A user at a terminal, communicatively coupled to the secure server by a secure link, can obtain web pages from web sites in a network, in encrypted form, via the secure link. Addresses associated with the web pages are altered to make it appear as if the web pages come from the secure server rather than from the web sites. Spoofing units may be used as alternative access points to the secure server, with the secure server sending the requested web pages directly to the terminal. In general, address rewriting and other manipulation can be performed on the requested web pages, such that the true sources of the web pages are disguised and such that subsequent communications from the terminal are directed to the secure server and/or spoofing unit, rather than to the true source of the web pages. Components of the user's privacy may be sold, or advertisements may be provided, in exchange for protection of the user's identity.

20 Claims, 5 Drawing Sheets

U.S. PATENT DOCUMENTS

| | | | |
|---|---|---|---|
| 6,047,268 | A | 4/2000 | Bartoli et al. |
| 6,081,900 | A | 6/2000 | Subramaniam et al. |
| 6,137,884 | A | 10/2000 | Micali |
| 6,144,638 | A | 11/2000 | Obenhuber et al. |
| 6,182,095 | B1 | 1/2001 | Leymaster et al. |
| 6,199,113 | B1 | 3/2001 | Alegre et al. |
| 6,256,739 | B1 | 7/2001 | Skopp et al. |
| 6,289,462 | B1 | 9/2001 | McNabb et al. |
| 6,345,303 | B1 | 2/2002 | Knauerhase et al. |
| 6,389,462 | B1 | 5/2002 | Cohen et al. |
| 6,401,125 | B1 | 6/2002 | Makarios et al. |
| 6,442,687 | B1 | 8/2002 | Savage |
| 6,460,076 | B1 | 10/2002 | Srinivasan |
| 6,463,533 | B1 | 10/2002 | Calamera et al. |
| 6,502,106 | B1 | 12/2002 | Gampper et al. |
| 6,502,135 | B1 | 12/2002 | Munger et al. |
| 6,704,873 | B1 | 3/2004 | Underwood |
| 6,708,200 | B1 | 3/2004 | Ura et al. |
| 6,721,424 | B1 | 4/2004 | Radatti |
| 6,779,111 | B1 | 8/2004 | Gehrmann et al. |
| 2002/0083178 | A1 | 6/2002 | Brothers |
| 2002/0184527 | A1 | 12/2002 | Chun et al. |
| 2004/0230820 | A1 | 11/2004 | Hui Hsu et al. |

OTHER PUBLICATIONS

Office Action of Aug. 3, 2006, in U.S. Appl. No. 09/972,226, 20 pages.
Office Action of Feb. 2, 2007, in U.S. Appl. No. 09/972,226, 15 pages.
Office Action of Jun. 11, 2007, in U.S. Appl. No. 09/972,226, 17 pages.
Office Action of Nov. 23, 2007, in U.S. Appl. No. 09/972,226, 12 pages.
Farah, "Encrypted Hypertext Transfer Protocol" filename:"I-D ActION: draft-farah-uggc-protocol-oo.txt", web address: http://www.ietf.org/internet-drafts-farah-uggc-protocol-oo.txt. Mar. 6, 2000.
Wu, et al., "Virtual Proxy Servers for WWW and Intelligent Agents on the Internet," IEEE, 1997, pp. 200-209.
Newton, "Newton's Telecom Dictionary," Telecom Books, 14th Edition, Oct. 1998, p. 260.
Kim, et al. "A Proxy Server Structure and its Cache Consistency Mechanism at the Network Bottleneck," IEEE, 1999. pp. 278-283.
Greene "Access Control Software on tap from Neoteris," Network World, vol. 18, No. 45, Nov. 5, 2001, pp. 23-24.
PCT Search Report, PCT/US01/40812, Apr. 9, 2002.
PCT Search Report, PCT/US02/16866, Sep. 26, 2002.
Aventail Corporation, "Proxy Architecture Versus Direct Connect," Aventail Corporation Tech Brief, Apr. 2001.
Office Action mailed Oct. 1, 2004 for U.S. Appl. No. 09/792,226, filed Feb. 22, 2001.
Office Action mailed Apr. 21, 2005 for U.S. Appl. No. 09/792,226, filed Feb. 22, 2001.
Office Action mailed Jun. 30, 2005 for U.S. Appl. No. 09/792,226, filed Feb. 22, 2001.
Office Action mailed Aug. 26, 2005 for U.S. Appl. No. 09/792,226, filed Feb. 22, 2001.
Demuth, et al. "Securing the anonymity of content providers in the World Wide Web", Jan. 1999, Proceedings of the SPIE., vol. 3657, p. 494-502. Dialog File 2, access No. 07404824.
Liebamann, "To have and have NAT: managing through the firewall", Jul. 1999, Business Communications Review, vol. 29, No. 7, p. 48-50. Dialog File 2 access No. 07561832.
Jackson, "Anonymous address and confidentiality of location", 1996, Information Hiding. First International Workshop Proceedings., p. 115-20, Dialog File 2, access No. 06490562.
Anonymizer, Inc., "Anonymizer URL Encryption", http://www.anonymizer.com, Nov. 27, 1999.
Anonymizer, Inc., "How to Use Anonymizer Surfing", http://www.anonymizer.com, May 2, 2000.
"EZproxy: A Remote User Authentication Tool for Libraries", May 2000, Status Line, Nylink, No. 142, pp. 9-10.
"Spotlight on the George Harvey Resource Center" MC, McConnell Columns, Radford University, vol. 7, No. 4, Apr. 2000, p. 3.

METHOD AND APPARATUS FOR ENCRYPTED COMMUNICATIONS TO A SECURE SERVER

This application is a continuation of U.S. patent application Ser. No. 09/580,365, filed May 26, 2000 now U.S. Pat. No. 7,509,490, which is incorporated by reference herein in its entirety.

BACKGROUND OF THE INVENTION

1. Field of the Invention

The present invention relates generally to communication with a network, and in particular, relates to encrypted communication with a network via a secure server.

2. Background Information

Networks such as the Internet and World Wide Web (web) are extremely popular to users as a source of information and entertainment. The web is used for communication between central sites (e.g., web sites) on the Internet and individual users who wish to communicate with the site. Two programs typically control the communications: a web browser that runs on the user's computer and a web server that runs on the web site's computer.

To obtain information from a web site, a web browser sends a request to a web server by transmitting a uniform resource locator (URL) address of the web site and by using a communication protocol such as Transmission Control Protocol/Internet Protocol (TCP/IP). In typical situations, such a request to the web server is in the form of a hypertext transfer protocol (HTTP) request that results in a transmission of hypertext markup language (HTML) documents (e.g., web pages) back to the web browser.

Many employers provide their employees with terminals, such as personal computers (PCs), which the employees can use to access the Internet to send/receive email and to "surf the Net." According to a common configuration, such PCs are connected together in a company's internal network, such as a local area network (LAN), and then connected via the company's proxy server to Internet servers.

The proxy server often serves as part of the company's "firewall," where incoming and outgoing communications can be monitored by the company's information systems. In operation, employees are generally forced to connect to the Internet via this firewall. In other words, all communications (usually in the form of packets) are passed first through the proxy server, and then out to the destination web site. Similarly, content requested from the Internet, such as HTML pages, are first sent to the proxy server, and then forwarded to the employee's terminal for display by a web browser.

Because of this standard network architecture, individual terminals (e.g., users or employees) are vulnerable to the monitoring of: a) content uploaded by the user to a web site, such as Internet email messages that the user writes and sends; b) content downloaded from a web site, such as HTML pages viewed on the web site or Internet email messages that the user receives and reads; and c) the Internet Protocol (IP) or URL addresses of servers to which the user sends/receives packets.

There are similar privacy and security issues involved with network architectures other than the corporate network described above. For example, users accessing the Internet from terminals in their homes sometimes have their packets routed through an Internet Service Provider (ISP) and/or along a system having a ring or loop configuration, such as a cable modem system. In such situations, hackers or other parties have the opportunity to monitor individual users' communication at the ISP or at other locations, and thus can obtain information that the users wish to keep confidential, such as URLs of visited web sites, IP addresses of servers used, content (e.g., HTML pages or email) sent/received by the user, etc.

Additional mechanisms are implemented by Internet-based systems that further jeopardize the freedom of users to communicate privately and securely with the Internet. For instance, companies that control employees' Internet usage sometimes implement firewall blocking or filtering to prevent access to particular web sites. Also, visited web sites often record IP addresses of clients (e.g., users) and collect other data to help identify clients during a profiling process. Further, web servers typically transmit "cookies" for storage in users' terminals. Cookies are electronic files sent by the web server to the web browser to help identify the user and to prepare customized web pages when the user returns to the web site. In typical situations, web pages and histories of URLs accessed (e.g., a web browser history file) are stored at the user's terminals, thereby further compromising the privacy of the user.

In short, there is a need to improve private and secure communications over networks such as the Internet.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a method and apparatus for secure communication to a network, such as the Internet, via a secure server are described in detail herein. In the following description, numerous specific details are provided, such as a description of various system components in FIG. 1, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
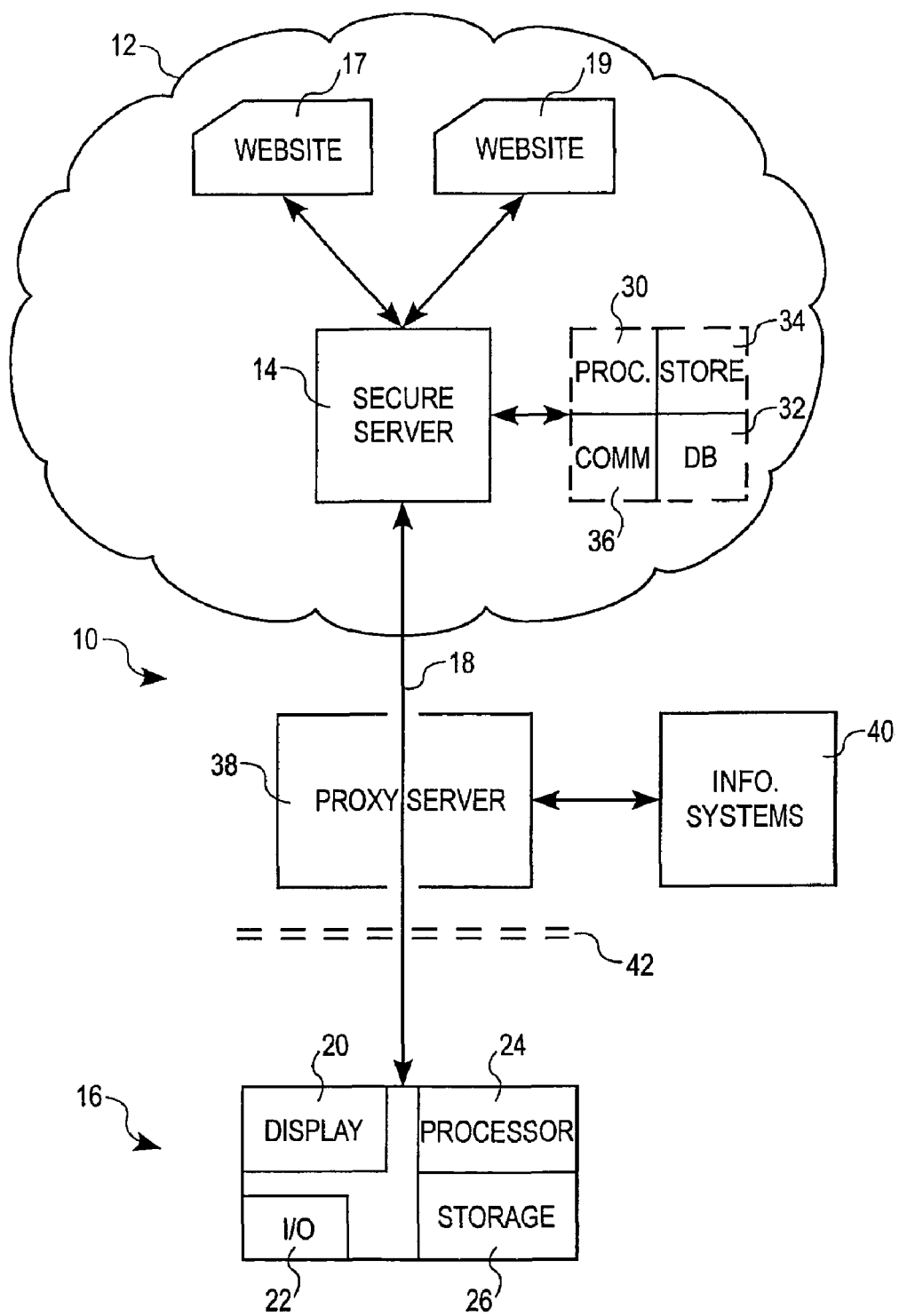
FIG. 1 shows a system that can implement an embodiment of the invention.

Referring first to FIG. 1, shown generally at 10 is a system that can implement an embodiment of the invention. The system 10 can include a network 12, such as the Internet, but other types of communication networks may be utilized as well. For example, the network 12 can comprise a local area network (LAN), virtual local area network (VLAN), asynchronous transfer mode (ATM) network, or other network or portion of a network.

The system 10 includes one or more secure servers 14 communicatively coupled to one or more terminals 16 via one or more secure links 18. The server 14 can be coupled to other servers (not shown) in the network 12 that run web server software. The servers in the network 12 can provide a plurality of web sites 17 and 19 having HTML, extensible markup language (XML), extensible style language (XSL), etc. web pages. Typically, the web sites 17 and 19 (or other components coupled to the network 12) are identifiable by a numeric IP address and/or by a URL address.

The web pages of the web sites 17 and 19 can be provided to components (e.g., to servers or terminals) communicatively coupled to the network 12 using a protocol such as TCP/IP, HTTP, FTP, or other suitable protocol. In one embodiment, the server 14 can securely provide web pages to the terminal 16, in a manner that will be described in further detail below.

The server 14 can include one or more processor units 30 to perform the various methods, processes, and algorithms described herein, using a compiler, for example. The processor unit 30 can be communicatively coupled to one or more database units 32, in a manner such that information in the database unit 30 is accessible by the processor unit 30. The server 14 can also include a storage unit 34 to provide the server 14 with additional storage capacity for storing software and other data. The server 14 may further include a communication unit 36 to provide communication hardware, software, protocols, and other features and functions for communication between the server 14 and the terminal 16 (or between the server 14 and other components connected to the network 12).

The storage unit 34 and database unit 30 can comprise machine-readable media. According to one embodiment, the storage unit 30 can store machine-readable instructions or software to perform the various functions described throughout this detailed description to provide secure communication with the terminal 16. The database unit 30 can store information specific to particular users or terminals 16, cookies, electronic files, and other such data related to one or more communication sessions between terminals 16 and the secure server 14.

The terminals 16 can comprise personal computers (PCs) to access the server 14. The terminals 16 each have a display unit 20 that allows users to view information sent to and from the server 14, using a suitable commercially available web browser such as Microsoft's Internet Explorer™ or Netscape's Navigator™. The terminal 16 can include an input/output unit 22, such as a keyboard and mouse. The terminal 16 may also include a processor 24, and a storage unit 26, which can be any type of machine-readable storage medium such as read only memory (ROM), random access memory (RAM), compact disks (CDs), digital versatile disks (DVDs), hard disk, magnetic tape, floppy disks, etc. The storage unit 26 can store the web browser, and can also include caches to store downloaded web pages and other information obtained during the course of communication with the network 12.

Although the terminal 16 is described herein for illustrative purposes as a PC, it is to be appreciated that other types of terminals may be used. These include laptops, enhanced functionality wireless devices, handheld devices, television sets, workstations (e.g., dumb terminals) connected to a network, and other such devices that can communicate with the network 12. Accordingly, embodiments of the invention are not limited by the specific type of terminal used.

The terminal 16 can be a stand-alone unit, or it may be connected to other terminals 16 forming part of a corporate LAN, for example. A typical corporate LAN communicates with the network 12 via a proxy server 38, operated by an information systems 40. In many cases, the informations systems 40 and/or the proxy server 38 operate a firewall system 42 to control and monitor network traffic sent to and from the network 12.

According to an embodiment of the invention, communication between the terminal 16 and the network 12 is conducted on the secure link 18 that goes through the proxy server 38 and firewall system 42. In such an embodiment, the communication can pass freely through the proxy server 38 and firewall system in a secure and private manner, as will be described below.

The secure link 18 can be and ISDN, T1, xDSL, SONET, Ethernet, or other type of high-speed link. The secure link 18 may also be a telephone modem link. Twisted-pair, coaxial cable, fiber optic, or other types of physical links/lines may be used. Wireless links, such as radio frequency, satellite, microwave, optical, etc. may be used as well. Accordingly, embodiments of the invention are not limited by the specific type of link used by the secure link 18.

Although a LAN-type configuration is shown in the embodiment of FIG. 1, it is understood that other embodiments of the invention may be implemented in other ways. For example, in one embodiment, an ISP may take the place of the proxy server 38, information systems 40, and firewall system 42, where the terminal 16 is an individual unit located in the user's home. Other configurations, such as loop configurations, are possible for implementing embodiments of the invention, so long as the secure link 18 can be provided between the terminal 16 and the secure server 14.

Figure 2:
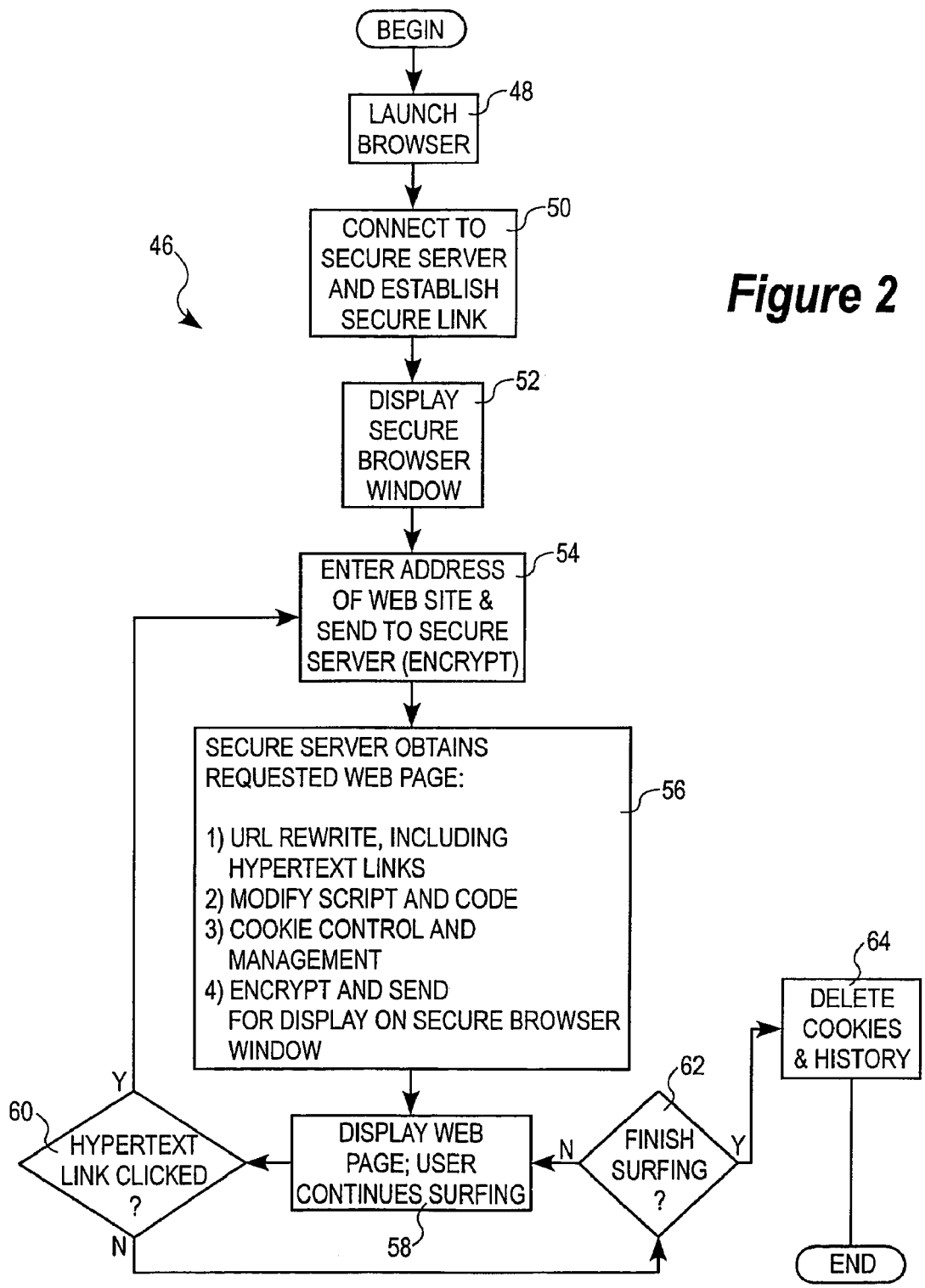
FIG. 2 is a flowchart showing an embodiment of a method for secure communication that can be implemented by the system of FIG. 1.

Shown next in FIG. 2 is a flowchart 46 depicting a method for secure communication that can be implemented by the system 10 of FIG. 1. A communication typically begins at a block 48, when the user launches a web browser in the terminal 16. Once the web browser is launched, the user may connect to the secure server 14 by entering a URL address of the secure server 14.

The address entered by the user may include the conventional http:// prefix, followed by the URL address (e.g., domain name) of the secure server 14 (which may include the conventional "www" designation). In one embodiment, the user may enter the prefix https://, followed by the URL address of the secure server 14, where https:// indicates a "hypertext transfer protocol secure" mode supported by software of the secure server 14.

Once the user has entered the URL address of the secure server 14, the web browser initiates a communication with the secure server 14 (e.g., sends a request) at the block 50. It is noted that such a communication is typically transmitted through the firewall system 42 and proxy server 38. In response to the web browser request, the secure server 14 establishes the secure link 18 to the terminal 16.

According to an embodiment of the invention, the secure link 18 may be established by the secure server 14 using secure server sockets layer (SSL) protocols and procedures, in a manner known in the art. Once the secure link 18 is established, data may be exchanged between the secure server 14 and the terminal 16 in an encrypted manner using RSA (with public and private keys) or other suitable encryption algorithms.

The user may establish the secure link 18 with the secure server 14 simply by entering https:// in one embodiment. In another embodiment, where the user enters http:// plus the URL address of the secure server 14, the secure link 18 may be established, for example, by subsequently clicking an "Enter Secure Mode" button on a web page provided by the secure server 14 in response to the initial web browser request/communication.

Figure 3:
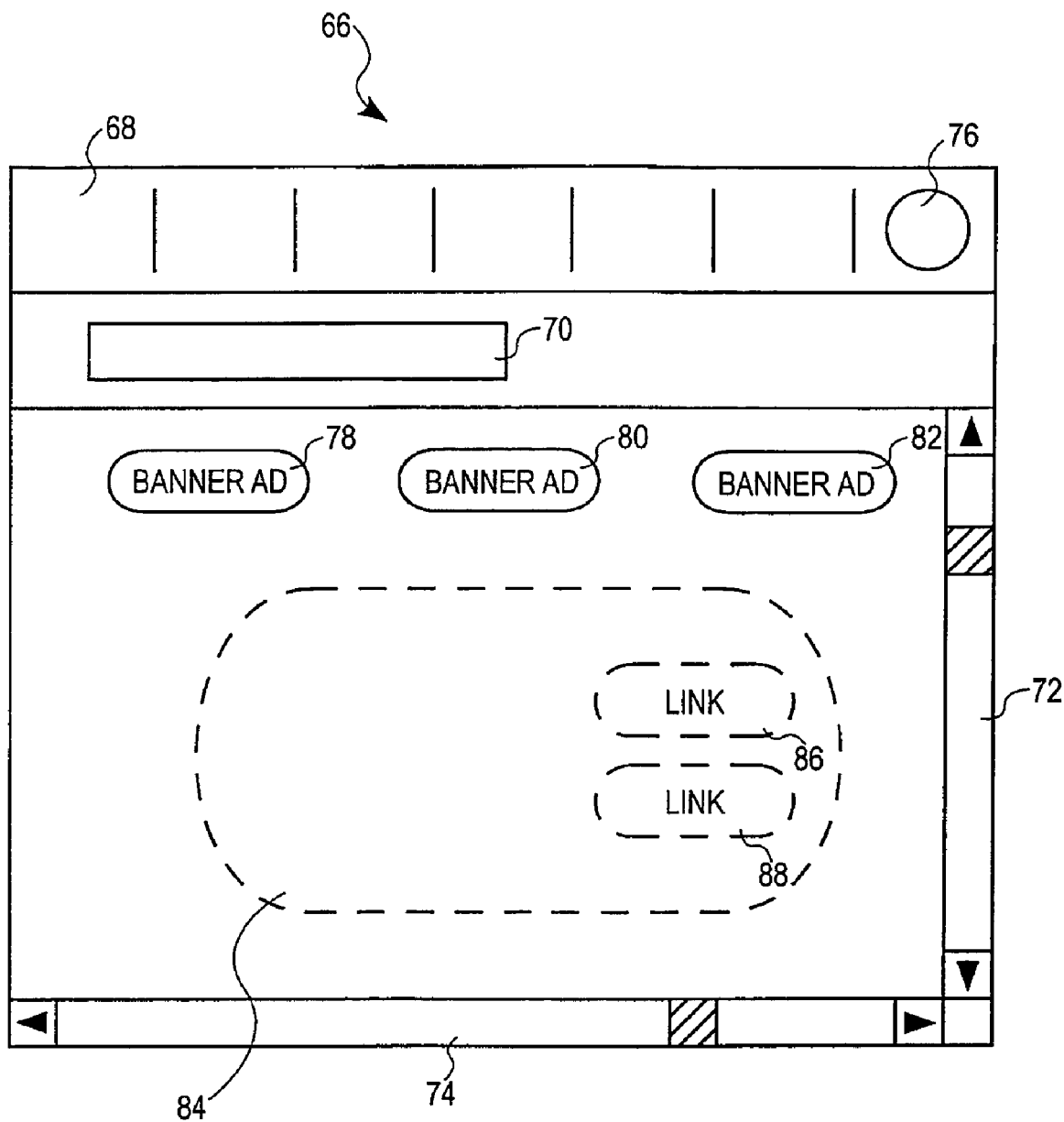
FIG. 3 shows an embodiment of a browser window that can be displayed using the secure communication method of FIG. 2.

Upon establishment of the secure link 18, a secure browser window may be displayed (at a block 52) on the display unit 20 of the terminal 16. An example of such a secure browser window is shown at 66 in FIG. 3. The secure browser window 66, in one embodiment, may be a new browser window launched on the terminal 16 by the secure server 14. In another embodiment, the secure browser window 66 may be a modified and secure version of the browser window which was previously launched at the block 48, and which is subsequently modified/secured by the secure server 14.

The secure browser window 66 can include a conventional menu/tool bar 68, an address field 70 to enter URL addresses of destination web sites, and scrolling controls 72 and 74. Additionally, the secure browser window 66 may include an icon 76 to assist the user in visually recognizing that the secure link 18 with the secure server 14 is active.

A display region of the secure browser window 66 can display a plurality of banner advertisements 78, 80, and 82, each provided with hypertext link(s). In some instances, one or more of the banner advertisements 78, 80, or 82 can be located in other regions of the secure browser window 66, such as next to the address field 70, and not just in the display region (sometimes referred to as a "chrome"). Specific tailoring (e.g., profiling) of these banner advertisements 78-82 with respect to the user is described later below. The display region can also display content 84 from web pages of websites 17 and 19 subsequently requested by the user. The displayed content of 84 can include one or more hypertext links 86-88.

It is noted at this point that because the secure link 18 is active, the proxy server 38 and/or information systems 40 cannot determine the content displayed by the secure browser window 66. While the proxy server 38 and/or information systems 40 may be able to detect that a communication is ongoing with the secure server 14 (e.g., by detecting the URL address of the secure server 14 that generated the secure browser window 66), all other content exchanged between the terminal 16 and secure server 14 is unintelligible data. That is, because the data is encrypted and because the proxy server 38 and/or information systems 40 do not have decryption algorithm (e.g., the private key), data sent to and from the secure browser window 66 is an incoherent data stream to them.

As an example at a block 54 in the flowchart 46 of FIG. 2, the user may subsequently enter a URL address of a destination web site in the address field 70. To send the URL address of the web site to the secure server 14 according to one embodiment, the web browser can first concatenate the URL address of the destination web site to the currently active URL address of the secure server 14 (by separating them with a forward slash "/"), encrypting the portion of the concatenated URL address that has the URL address of the destination web site, and then transmitting this data/request to the secure server 14. The information detected by the proxy server 38 and/or information systems 40, if any, may thus be just the URL address of the secure server 14, followed by unintelligible encrypted data. In this manner, it appears to the proxy server 38 and/or information systems 40 that all communication from the terminal 16 is directed to the secure server 14 and not to other URL or IP addresses. The proxy server 38 and/or information systems 40 cannot determine the activity at the secure server 14 directed towards transactions with the destination web site.

Upon receipt of the request from the user's web browser, the software in the secure server 14 decrypts the request to obtain the URL address of the destination web site. The secure server 14 then connects to the destination web site to obtain the appropriate web page, while performing additional encryption or URL rewriting to hide or delete the IP address of the terminal 16 that originated the request. As such, according to one embodiment, the destination web site cannot determine the IP address of the terminal 16 that originally requested the web page, due to the fact that the IP address of the secure server 14 appears as the source address to the web site. Therefore, IP addresses of users and their identity are kept protected from visited web sites.

When the requested web page is received from the destination web site by the secure server 14, software in the secure server 14 performs various manipulative processes on the web page at a block 56. For example, software of the server 14 can perform URL rewriting of hypertext links in the web page, such that URL addresses of these hypertext links are concatenated with the URL address of the secure server 14, separated by a forward slash "/". These modifications prevent any further contact between the terminal 16 and web sites corresponding to the hypertext links, except via the secure server 14, if these hypertext links are subsequently clicked by the user, as described later with respect to a block 60 in the flowchart 56.

The software of the secure server 14 may also make modifications to is the script and/or code of the web page, such as modifications to the HTML, JavaScript™ and Java™ code. This ensures that the user's web browser never receives an instruction to contact a web site or server other than the secure server 14. For example, with prior art methods, the user's web browser may receive a command to contact various other servers or web sites (e.g., third-party ad servers or web sites linked to the displayed web page via hypertext links), which results in the transmission of the IP address of the terminal 16 to these other servers or web sites. An embodiment of the invention rewrites such commands so that the user's web browser instead contacts the secure server 14, and asks it to retrieve the appropriate web page, file, etc., thereby protecting the IP address of the terminal 16 from the other servers or web sites.

At the block 56, the software of the secure server 14 may also perform cookie control and management operations. For example, if users have specified that they do not wish to receive cookies or other electronic files, then the secure server 14 can block or filter cookies transmitted from the web site along with the web page. Furthermore, if the user has agreed to some or no limitation on cookie exchange, then the secure server 14 may control the type and quantity of cookies that are eventually passed to the terminal 16. Additional details of how the user can control cookies are described later below.

After receiving the web page and performing the activities described above, the secure server 14 encrypts the web page and sends it to the web browser of the terminal 16, via the secure link 18, for display on the secure browser window 66. According to one embodiment, all of the content of the page may be encrypted, such that the proxy server 38 and/or information systems 40 only detects an unintelligible data stream. As mentioned previously, the URL address and other identifying information of the web page, including it's hypertext links, are concatenated with the URL address of the secure server 14 and then encrypted, such that it appears that the data is originating from the secure server 14.

The encrypted information passes through the proxy server 38 and firewall system 42, and is received by the terminal 16. The information is decrypted and displayed on the secure browser window 66 at a block 58. Once displayed, the user can view the web page and continue surfing, and in effect, the user occupies a "private Internet."

If the user clicks on a hypertext link on the displayed web page at the block 60, then the web browser is instructed to directly contact the secure server 14 for the web page, since the URL address associated with the hypertext link was rewritten at the block 56. The URL address of the clicked hypertext link, which is generally already concatenated with the URL address of the secure server 14 at this point, is encrypted and sent to the secure server 14 at the block 54. It is noted that if the URL address of the hypertext link is not concatenated already, if the user entered a new URL address in the address field 70, or if the user selected a URL address from a "Favorites" menu, such URL addresses are concatenated with the URL address of the secure server 14, encrypted, and then the entire concatenated address is transmitted to the secure server 14 via the secure link 18.

If the user does not click a hypertext link at the block 60, then a determination is made at a block 62 whether the user is finished surfing/browsing. If the user is not finished, then the user may continue surfing at the block 58, and the process repeats as described above.

If the user is finished surfing at the block 62, then cookies, browsing file histories, cached web pages, and other such information are deleted from the storage unit 26 of the terminal 16. The deletion at the block 64 may be accomplished any number of ways. For instance, upon notification of the end of transmission (e.g., at sign-off or log-out), the secure server 14 can transmit instructions to the terminal 16 that triggers software stored in the terminal 16 to delete the cookies, file history, etc. In one embodiment, the user can download cookie deletion software from the secure server 14, and use the software to delete cookies at the end of a session.

Deletion of cookies or cookie control can be accomplished in several ways. In one embodiment, the user may set preferences and transmit the preferences to the secure server 14. The preferences can specify what cookies can be allowed to be passed on to the terminal 16 by the secure server 14, while undesirable cookies are not passed on by the secure server 14.

In another embodiment, a digital identity can be established for the user and maintained at the secure server 14. Cookies for that user may then be stored in the database unit 32 under the digital identity, and cookies are never actually transferred to the terminal 16.

Figure 4:
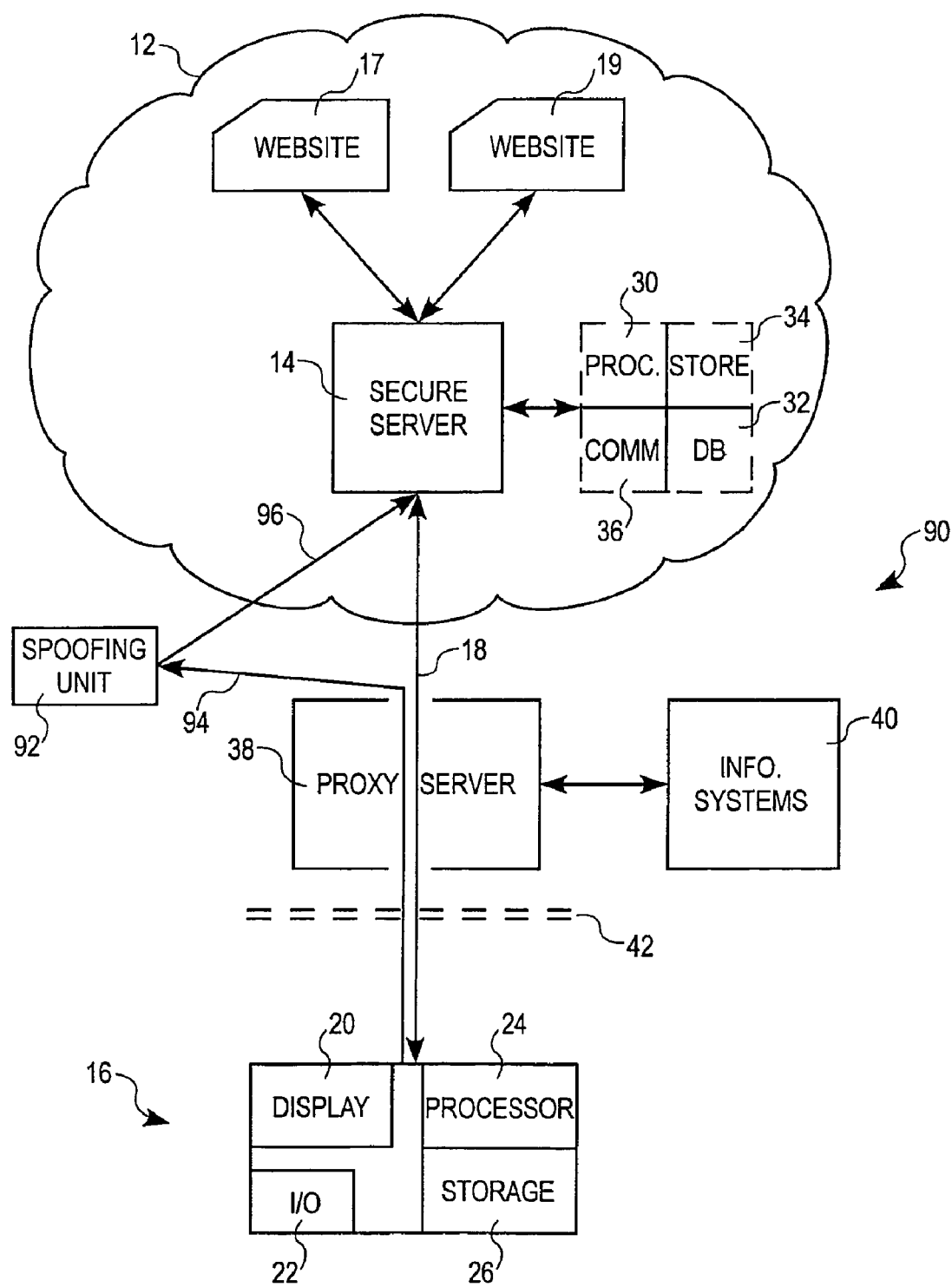
FIG. 4 shows a system that can implement another embodiment of the invention.

It is noted that in the system 10 shown in FIG. 1 and in other configurations, the proxy server 38 and/or information systems 40 may be able to detect the number and length of communications from the terminal 16 to the secure server 14, albeit not the content of such communications. As a result, the proxy server 38 and/or information systems 40 may be eventually programmed to "block" communication to and from the URL/IP address of the secure server 14. In other settings, it may be possible for organizations, ISPs, government bodies, etc. to restrict access to the secure server 14 by blocking packets having source/destination addresses identifiable to the secure server 14. Accordingly, an embodiment of a system 90 is shown in FIG. 4 that provides the terminal 16 with multiple access points to the secure server 14, thereby bypassing blocking mechanisms.

The system 90 includes one or more spoofing units 92 communicatively coupleable to the terminal 16. The spoofing unit 92 can comprise a server, a web site, a web page, or any other network component that has a static IP or URL address. The spoofing unit 92 can include/operate software to establish a secure connection 94 with the terminal 16 and a connection 96 (which can be secure) with the secure server 14, and can include software to pass browser requests from the terminal 16 to the secure server 14 via the connections 94-96.

Such software may be distributed to operators of the spoofing unit 92 by owners of the secure server 14 free of charge (e.g., for example, if the operator of the spoofing unit is an advocate of "privacy" or "free speech") or based on various business incentives (e.g., installation of the software in exchange for banner advertisement space on the secure browser window 66).

Figure 5:
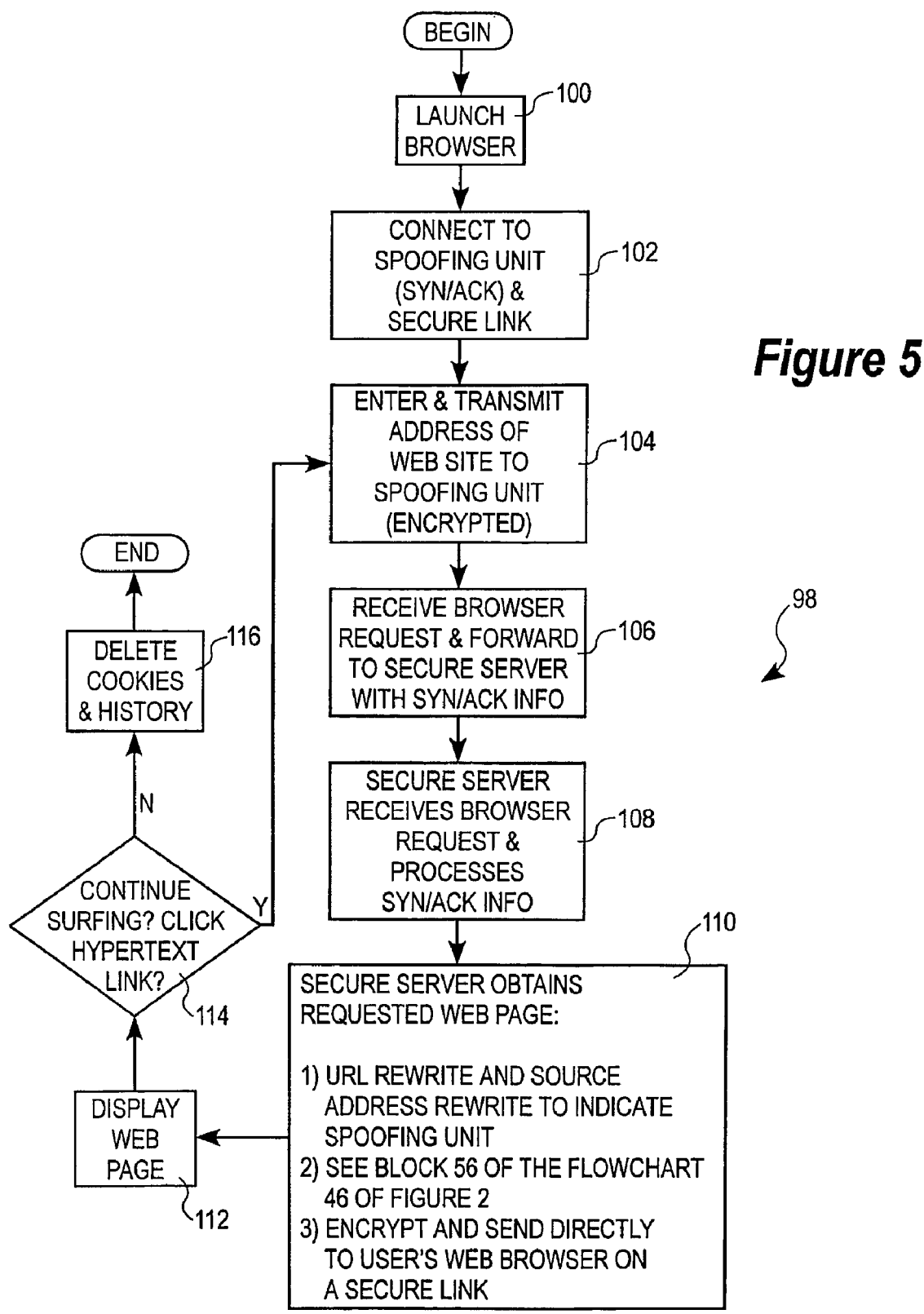
FIG. 5 is a flow chart showing an embodiment of a method for secure communication that can be implemented by the system of FIG. 4.

FIG. 5 shows a flowchart 98 depicting an embodiment of a method for secure communication that can be implemented by the system 90. In operation, the terminal 16 may indirectly access the secure server 14 when the user launches a web browser at a block 100 and enters https:// followed by the domain name (or URL) address of the spoofing unit 92. This results in a secure connection to the spoofing unit 92, at a block 102, using a suitable protocol, such as TCP/IP. The TCP/IP protocol can include "handshaking" processes where SYN and ACK information is exchanged between the terminal 16 and the spoofing unit 92. Entering the https:// prefix allows the user to enter into a secure mode by establishing the secure connection 94, thereby allowing the user to subsequently enter and transmit to the spoofing unit 92, a URL address of a destination web site at a block 104.

In one embodiment, the user may enter the URL address of the destination web site after a string comprising the https:// prefix and URL address of the spoofing unit 92. The URL address of the destination web site is subsequently concatenated with the previously entered (or automatically entered) string, and the portion of the resulting concatenated URL address having the URL address of destination web site is encrypted, in a manner similar to that described above with respect to FIGS. 1-2. In another embodiment, the URL address of the spoofing unit may also be concatenated with the string and then encrypted. This way, the proxy server 38 and/or information systems 40 detects only the URL or IP address of the spoofing unit 92, if anything, and not the address of the destination web site or of the secure server 14.

Upon receipt of the web browser request, software in the spoofing unit 92 recognizes the request has being destined to the secure server 14. This may be done by decrypting the encrypted addresses and then reading the URL address of the secure server 14, or by other methods to detect that the request has to be forwarded to the secure server 14. The spoofing unit 92 forwards the request to the secure server 14 via the connection 96 at a block 106. It is noted that the spoofing unit 92 can also forward the SYN/ACK information or other data to assist the secure server 14 in maintaining and synchronizing subsequent communication with the terminal 16. At a block 108, the secure server 14 receives the request from the spoofing unit 92 and processes the SYN/ACK information to keep track and synchronize the order of packets. A person skilled in the art will know how to implement the SYN/ACK process based on the description provided herein.

After the secure server 14 receives the request and SYN/ACK information from the spoofing unit 92, it decrypts the data to obtain the URL address of the destination web site and obtains the requested web page therefrom at a block 110. Similar to the block 56 in the flowchart 46 of FIG. 2, the secure server 14 at the block 110 can perform URL rewriting.

This may include rewriting the URL address of the requested web page (e.g., "spoofing" its URL address) and its hypertext links to indicate the spoofing unit 92 as the source. Modification of script and code (e.g. Java™ and JavaScript™) of the web page, may also be performed to ensure that all subsequent requests by the web browser at the terminal 16 are sent to the spoofing unit 92 (and from there, subsequently sent to the secure server 14).

As with the block 56 of FIG. 2, the secure server 14 may perform cookie control and other electronic file management at the block 110. After the processes described above are performed on the web page, the web page is encrypted and directly sent for display to the terminal 16, via the secure link 18, at a block 112.

Since the return IP or URL address of all packets sent from the secure server 14 to the terminal 16 are "spoofed" so that they appear to come from the spoofing unit 92, it is virtually impossible for the proxy server 38 and/or information systems 40 to determine that the packets came from the secure server 14 (and from addresses other then the address of the spoofing unit 92). This can prove particularly useful if the user is viewing web pages of a controversial or controlled nature. The configuration of the system 90 of FIG. 4 makes it appear to the proxy server 38 and/or information system 40 that the encrypted content viewed by the user, whatever it may be, is originating from an innocuous web site at the spoofing unit 92.

At a block 114 in FIG. 5, the user may click on a hypertext link on the displayed web page or enter a URL address of another web site (e.g., continue to "surf"), thereby resulting in transmission of encrypted web browser requests to the spoofing unit 92, in a manner described above with respect to blocks 104-112. As before, web browser requests are sent to the spoofing unit 92 via the secure connection 94 (and forwarded to the secure server 14 via the connection 96), while retrieved web pages are sent directly to the terminal 16 from the secure server 14, without having to go through the spoofing unit 92. This is particularly advantageous because the bandwidth capacity of the spoofing unit 92 is not overwhelmed. That is, web browser requests take up significantly less bandwidth than web page content produced in response to such request. Hence, the spoofing unit 92 can easily accommodate multiple web browser requests, while the secure server 14 has the larger bandwidth to handle the content, via the secure link 18.

If the user stops surfing at the block 114, then at log-out, cookies, file histories, cached web pages, etc. are deleted at a block 116. This may be done in a manner similar to the block 64 of FIG. 2.

As mentioned, there may be more than one spoofing unit 92. Hence, if access to any one of the spoofing units 92 is blocked, access to the secure server 14 may be obtained from other spoofing units. According to one embodiment, users may be provided with hardcopy or online URL directories of spoofing units, such that they can identify and connect to any of these participating units. In another embodiment, the secure server 14 can perform hand-off and redirection of the user's web browser to different spoofing units, such that the user's web browser can "dynamically" connect or reconnect to different spoofing units, as directed by the secure server 14. The secure server 14 may also automatically and dynamically provide the user's web browser with URL addresses of spoofing units (e.g., during a transmission of an encrypted web page), such that the user's web browser can automatically connect to such URL addresses for the next transaction(s).

Various features and business models may be implemented by the embodiments described above and shown in the figures, to manage and customize a user's privacy. According to one embodiment, a user's privacy can be provided by the secure server 14 in exchange for placement of user-specific or general banner advertisements 78-82 on the secure server window 66 of FIG. 3. In such a case, user identity, user IP addresses, and user IP addresses, and user content (e.g., content delivered or accessed) may be kept private in exchange for placement of banner advertisements.

In another embodiment, components that are less important to users and most important to advertisers, web sites, or employers can be sold by the organization operating the secure server 14, with the user's permission. These components include:

time spent online, bandwidth used (e.g., provided to employers);
web surfing patterns of the user and correlations (e.g., provided to advertisers, web sites, and vendors); or
personal preferences and interest of the user (e.g., provided to advertisers, web sites, and vendors).

An example includes cookie control. Based on the preferences and instructions of the user, the user may control the type and quantity of cookies delivered to or filtered from the user's web browser by the secure server 14. In one embodiment, the user may be able to designate cookies for storage under a pseudonym, directly on the secure server 14, thereby adding another layer of privacy. Because cookies are often used to build profiles of the user (by web sites or advertisers), controlling cookie exchange with destination web sites allows the user to manage the amount of privacy provided by the secure server 14.

According to one embodiment, a user may allow operators of the secure server 14 to collect specified data related to the web browsing habits of the user, and then sell such information to advertisers, in exchange for protecting the user's privacy at all times. In this embodiment, such information may be sold to the advertisers with the permission of the user, and includes information that the user is generally not sensitive about.

In conclusion then, embodiments of the invention provide a secure server 14. Users at terminals 16 can obtain information from web sites in the network 12 through the secure link 18, in encrypted form, thereby protecting their privacy and security. Such information appears as if it comes from the secure server 14 rather than specific web sites. Spoofing units 92 may be used as alternative access points to the secure server 14, with the secure server 14 sending requested information directly to the terminal 16. In general, URL rewriting and other manipulation can be performed such that the true source of the information is disguised and such that subsequent communication from the terminal 16 is directed to the secure server 14 and/or spoofing unit 92, rather than to the true source of the information (e.g., the web site). Components of the user's privacy may be sold as specified by the user, and advertisements may be displayed in exchange for protection of the user's identity.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An article of manufacture comprising a computer-readable memory medium having stored thereon program instructions executable on a first server in a first Internet domain to implement a method, the method comprising:
   receiving a request originating from a client computer for a web page in a second Internet domain that is different from the first Internet domain, wherein the request is received at the first server in the first Internet domain and includes a URL that includes an encrypted address of the web page in the second Internet domain appended after an unencrypted form of a first address hosted by the first server;
   decrypting the encrypted address of the web page;
   in response to said decrypting, communicating with a second server in the second Internet domain to retrieve the web page from the second Internet domain; and
   sending the retrieved web page to the client computer.

2. The article of manufacture of claim 1,
   wherein the retrieved web page includes one or more links pointing to the second Internet domain;
   wherein the method further comprises:
      before sending the retrieved web page to the client computer, modifying the retrieved web page by modifying the one or more links to point to the first Internet domain instead of the second Internet domain.

3. The article of manufacture of claim 1,
   wherein the retrieved web page includes scripting code operable to direct requests from the client computer to one or more additional Internet domains other than the first Internet domain;
   wherein the program method further comprises:
      before sending the retrieved web page to the client computer, modifying the retrieved web page by modifying the scripting code to direct requests to the first Internet domain instead of the one or more additional Internet domains.

4. The article of manufacture of claim 1,
   wherein the request received at the first server is addressed to the URL that includes the encrypted address of the web page in the second Internet domain appended after the unencrypted form of the first address hosted by the first server.

5. The article of manufacture of claim 1,
   wherein the request from the client computer includes an IP address of the client computer;
   wherein, in communicating with the second server in the second Internet domain, the first server does not provide the IP address of the client computer to the second server.

6. The article of manufacture of claim 1, wherein the method further comprises:
   receiving a cookie from the second server in the second Internet domain along with the retrieved web page; and
   blocking the cookie from being sent along with the retrieved web page to the client computer.

7. The article of manufacture of claim 1, wherein the method further comprises:
   receiving preference information from the client computer indicating which types of cookies are allowed to be passed to the client computer;
   receiving a particular cookie from the second server in the second Internet domain along with the retrieved web page; and
   blocking the particular cookie from being sent along with the retrieved web page to the client computer in response to determining that the preference information indicates that the particular cookie is not allowed to be passed to the client computer.

8. The article of manufacture of claim 1, wherein the method further comprises:
   receiving from the client computer a notification that a user of the client computer is finished web browsing; and
   in response to receiving the notification, transmitting instructions to the client computer to cause the client computer to perform one or more of:
   deleting stored cookies;
   deleting file history.

9. The article of manufacture of claim 1, wherein the method further comprises:
   establishing a digital identity of a user of the client computer;
   receiving a cookie from the second server in the second Internet domain along with the retrieved web page; and
   storing the cookie in a database at the first server in association with the digital identity of the user.

10. The article of manufacture of claim 1,
    wherein said receiving the request from the client computer comprises receiving the request in an encrypted form via a secure communication protocol;
    wherein the method further comprises decrypting the request in accordance with the secure communication protocol in response to receiving the request.

11. The article of manufacture of claim 10,
    wherein the secure communication protocol is a Secure Sockets Layer (SSL) protocol.

12. The article of manufacture of claim 1,
    wherein, in the URL, the encrypted address of the web page is separated from the unencrypted form of the first address by a forward slash character.

13. A server computer system comprising:
    a first server in a first Internet domain, wherein the first server includes:
       one or more processors; and
       memory storing program instructions;
    wherein the program instructions are executable by the one or more processors to implement:
    the first server receiving a request originating from a client computer for a web page in a second Internet domain that is different from the first Internet domain, wherein the request includes a URL that includes an encrypted address of the web page in the second Internet domain appended after an unencrypted form of a first address hosted by the first server;
    the first server decrypting the encrypted address of the web page;
    in response to said decrypting, the first server communicating with a second server in the second Internet domain to retrieve the web page from the second Internet domain; and
    the first server sending the retrieved web page to the client computer.

14. The server computer system of claim 13,
    wherein the retrieved web page includes one or more links pointing to the second Internet domain;
    wherein the program instructions are further executable by the one or more processors to implement:
       before sending the retrieved web page to the client computer, the first server modifying the retrieved web page by modifying the one or more links to point to the first Internet domain instead of the second Internet domain.

15. The server computer system of claim 13, wherein the retrieved web page includes scripting code operable to direct requests from the client computer to one or more additional Internet domains other than the first Internet domain;
wherein the program instructions are further executable by the one or more processors to implement:
before sending the retrieved web page to the client computer, the first server modifying the retrieved web page by modifying the scripting code to direct requests to the first Internet domain instead of the one or more additional Internet domains.

16. The server computer system of claim 13, wherein the program instructions are further executable by the one or more processors to implement:
the first server receiving a cookie from the second server in the second Internet domain along with the retrieved web page; and
the first server blocking the cookie from being sent along with the retrieved web page to the client computer.

17. A method comprising:
a first server in a first Internet domain receiving a request originating from a client computer for a web page in a second Internet domain that is different from the first Internet domain, wherein the request includes a URL that includes an encrypted address of the web page in the second Internet domain appended after an unencrypted form of a first address hosted by the first server;
the first server decrypting the encrypted address of the web page;
in response to said decrypting, the first server communicating with a second server in the second Internet domain to retrieve the web page from the second Internet domain; and
the first server sending the retrieved web page to the client computer.

18. The method of claim 17,
wherein the retrieved web page includes one or more links pointing to the second Internet domain;
wherein the method further comprises:
before sending the retrieved web page to the client computer, the first server modifying the retrieved web page by modifying the one or more links to point to the first Internet domain instead of the second Internet domain.

19. The method of claim 17,
wherein the retrieved web page includes scripting code operable to direct requests from the client computer to one or more additional Internet domains other than the first Internet domain;
wherein the method further comprises:
before sending the retrieved web page to the client computer, the first server modifying the retrieved web page by modifying the scripting code to direct requests to the first Internet domain instead of the one or more additional Internet domains.

20. The method of claim 17, further comprising:
the first server receiving a cookie from the second server in the second Internet domain along with the retrieved web page; and
the first server blocking the cookie from being sent along with the retrieved web page to the client computer.

* * * * *